(12) United States Patent
Watt Lagnese et al.

(10) Patent No.: US 10,949,937 B1
(45) Date of Patent: Mar. 16, 2021

(54) ESTATE RESOURCE SYSTEM FOR SETTLEMENT OF ESTATE ASSETS

(71) Applicant: Wells Fargo Bank, N.A., San Francisco, CA (US)

(72) Inventors: Mary Ann Watt Lagnese, Fountain Hills, AZ (US); Margaret Melchior, Charlotte, NC (US); Scott Stout, Huntersville, NC (US); Adam Davis, Austin, TX (US); Catalina Johnson, San Francisco, CA (US); Paige Wilbur, Dallas, TX (US); Alicia Moore, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 492 days.

(21) Appl. No.: 15/339,529

(22) Filed: Oct. 31, 2016

(51) Int. Cl.
  *G06Q 50/18* (2012.01)
  *G06Q 50/16* (2012.01)
  *G06Q 10/06* (2012.01)

(52) U.S. Cl.
  CPC ..... *G06Q 50/186* (2013.01); *G06Q 10/06395* (2013.01); *G06Q 10/063114* (2013.01); *G06Q 50/163* (2013.01); *G06Q 50/18* (2013.01)

(58) Field of Classification Search
  None
  See application file for complete search history.

(56) References Cited

U.S. PATENT DOCUMENTS

| | | | | |
|---|---|---|---|---|
| 2005/0273346 | A1* | 12/2005 | Frost | G06Q 30/00 705/316 |
| 2007/0192114 | A1* | 8/2007 | Parpala | G06Q 50/18 705/312 |
| 2010/0063908 | A1* | 3/2010 | Racanelli | G06Q 50/186 705/31 |

(Continued)

FOREIGN PATENT DOCUMENTS

WO   WO-2013059871 A1 *  5/2013   ........... G06Q 50/265

OTHER PUBLICATIONS

Hansen Dordell, "Trust Estate Settlement Process" (Mar. 2015) (available online at https://hansendordell.com/wp-content/uploads/2015/03/trust-estate-settlement-process-LMS-v1.pdf) (Year: 2015).*

*Primary Examiner* — Jan P Mincarelli
(74) *Attorney, Agent, or Firm* — Shumaker & Sieffert, P.A.

(57) ABSTRACT

Techniques are described that provide a centralized system to coordinate the disparate teams involved in settling or reconciling the affairs of a given estate. These techniques provide a centralized estate resource system (ERS) to create, manage, track, and coordinate task checklists and actions for each of the teams including interactions between teams. The ERS may assign specific personnel within each team to a given estate, send notifications and warnings to appropriate team members when tasks are due or complete, and facilitate messaging between team members to communicate when information is needed or has become available. The ERS may provide updated status and information across teams without violating privacy or security regulations, as may be (Continued)

the case with email, text messages, or voice messages. In addition, the ERS may provide a centralized repository for information, thus avoiding repeated queries for the same information and documents to the decedent's representative.

18 Claims, 6 Drawing Sheets

(56) References Cited

U.S. PATENT DOCUMENTS

| | | | |
|---|---|---|---|
| 2013/0041711 A1* | 2/2013 | Girard | G06Q 10/0635 705/7.28 |
| 2013/0212197 A1* | 8/2013 | Karlson | G06Q 10/109 709/206 |
| 2014/0359291 A1* | 12/2014 | Wilson | G06Q 50/265 713/168 |
| 2015/0254795 A1* | 9/2015 | Levin | G06F 21/6245 705/312 |
| 2017/0096235 A1* | 4/2017 | Thomas | B64D 45/00 |
| 2017/0210484 A1* | 7/2017 | Figard | B64D 45/00 |

* cited by examiner

ESTATE RESOURCE SYSTEM FOR SETTLEMENT OF ESTATE ASSETS

TECHNICAL FIELD

The disclosure relates to computing devices and systems for financial asset management.

BACKGROUND

When a bank customer dies, the decedent customer's representative (e.g., the executor) needs to work with the bank to settle or reconcile the assets held by the bank for the decedent's estate. In some examples, the bank may serve as the executor or trustee and may directly handle the estate settlement services. In other examples the bank may serve as an agent for the decedent's representative. As an example, an estate settlement services provided by the bank may include the tasks of paying funeral expenses out of the decedent's accounts, paying creditors and debts out of the decedent's accounts, making distributions to beneficiaries for any trusts or "payable-on-death" accounts held by the decedent at the bank, closing or transferring ownership of accounts and safety deposit boxes held by the decedent at the bank, managing the sale and distribution of tangible personal property of the decedent, filing tax returns for decedent's estate, and similar transactions.

The estate settlement services provided by the bank may include multiple teams to perform the different tasks listed above. Each of the teams may work on a different portion of the decedent's estate, e.g., will administration, tangible personal property, tax and relationship management. As such, each of the teams may perform completely separate tasks, access completely different resources, and keep completely separate records pertaining to the respective portion of the decedent's estate. Although each of the teams may ostensibly operate in a silo, the teams may be dependent on each other for at least some information. For example, an estate tax team may need to wait for a tangible personal property team to sell and distribute the decedent's tangible personal property before preparing and filing the estate taxes. To obtain the necessary information, a member of a first team typically emails, texts, calls, or otherwise messages a member of another team of the estate settlement services to request the information, which is time consuming, difficult to track and manage, and may violate privacy or security regulations.

When the decedent's executor or representative is not the bank, often the decedent's representative is close to the decedent, such as the decedent's spouse, child, sibling, or another of the decedent's surviving family members or friends. The representative may be grieving and dealing with many issues surrounding the death of their loved one. In working with the bank to settle the decedent's financial assets, the decedent's representative may be required to provide similar details and documentation to each of the different teams of the estate settlement services. As such, the estate settlement services provided by the bank may actually add to the representative's burden by effectively causing the representative to relive their loved one's death with repetitive requests for information from each estate services team.

SUMMARY

In general, the disclosure is directed to a centralized estate resource system (ERS) configured to coordinate and manage an estate settlement services to settle or reconcile the estate of a decedent bank customer. The estate settlement services provided by the bank may include a plurality of estate settlement services teams to perform the different tasks involved in settling or reconciling the decedent's estate assets. Each of the teams may work on a different portion of the decedent's estate.

The techniques described by this disclosure provide a centralized system to coordinate the disparate teams involved in settling or reconciling the affairs of a given estate. These techniques provide a centralized estate resource system to create, manage, track, and coordinate task checklists and actions for each of the teams including interactions between teams. The centralized system, according to the techniques of this disclosure, may assign specific personnel within each team to a given estate, send notifications and warnings to appropriate team members when tasks are due or complete, and facilitate messaging between team members to communicate when information is needed or has become available. The system may provide updated status and information across teams without violating privacy or security regulations, as may be the case with email, text messages, or voice messages. In addition, the system may provide a centralized repository for information, thus avoiding repeated queries for the same information and documents to the decedent's representative.

In one example, the disclosure is directed to a centralized computing device for reconciling estate assets, the device comprising: one or more interfaces connected to a plurality of estate settlement services teams associated with a financial institution, one or more storage units configured to store information related to estate assets of at least one decedent of the financial institution, and one or more processors in communication with the one or more interfaces and the one or more storage units. The processors may be configured to: create an estate account for the at least one decedent, wherein the estate account includes the estate asset information for the at least one decedent and task checklists for the plurality of estate settlement services teams, authorize at least one team member of each of the plurality of estate settlement services teams to access the estate account for the at least one decedent, and manage the task checklists for the plurality of estate settlement services teams based on input from the at least one team member of each of the plurality of estate settlement services teams. Each of the task checklists may indicate tasks to be completed by a respective one of the plurality of estate settlement services teams to settle the estate assets of the decedent.

In another example, the disclosure is directed to a method for reconciling estate assets, the method comprising: creating, by a centralized computing device, an estate account for at least one decedent of a financial institution, wherein the estate account includes estate asset information for the at least one decedent and task checklists for a plurality of estate settlement services teams associated with the financial institution. Additionally, authorizing, by the centralized computing device, at least one team member of each of the plurality of estate settlement services teams to access the estate account for the at least one decedent; and managing, by the centralized computing device, the task checklists for the plurality of estate settlement services teams based on input from the at least one team member of each of the plurality of estate settlement services teams, wherein each of the task checklists indicate tasks to be completed by a respective one of the plurality of estate settlement services teams to settle the estate assets of the at least one decedent.

In another example, the disclosure is directed to a system for reconciling estate assets, the system comprising: a plurality of estate settlement services teams associated with a financial institution, and a centralized computing device connected to the plurality of estate settlement services teams and configured to create an estate account for at least one decedent of the financial institution. The estate account may include estate asset information for the at least one decedent and task checklists for the plurality of estate settlement services teams. Each of the task checklists may indicate tasks to be completed by a respective one of the plurality of estate settlement services teams to settle the estate assets of the decedent, wherein at least one team member of each of the plurality of estate settlement services teams accesses the estate account for the at least one decedent via the centralized computing device, updates at least one of the task checklists for the respective one of the plurality of estate settlement services teams based on completion of one or more of the tasks indicated in the one of the task checklists, and views the task checklists for other of the plurality of estate settlement services teams.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
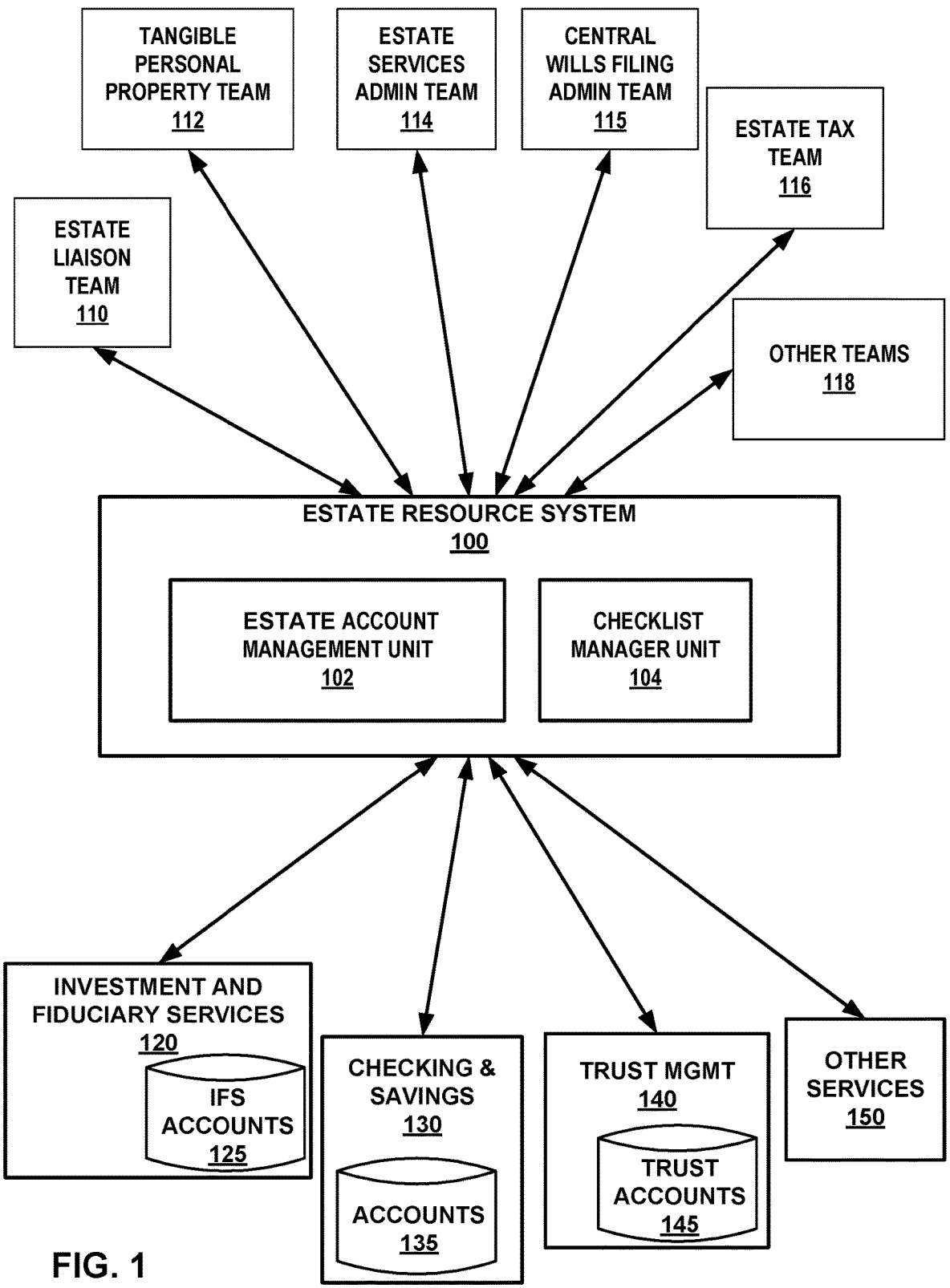
FIG. 1 is a conceptual block diagram illustrating an example estate resource system that consolidates and manages estate settlement activities across a variety of banking and external functions in accordance with one or more techniques of this disclosure.

This disclosure is directed to a centralized estate resource system configured to coordinate and manage an estate settlement services to settle or reconcile the estate of a decedent bank customer. The estate settlement services provided by the bank may include a plurality of estate settlement services teams to perform the different tasks involved in settling or reconciling the decedent's estate assets. Each of the teams may work on a different portion of the decedent's estate. As an example, the estate settlement services may include an estate settlement administration (ESA) team, an estate services liaison team (ESLT), a central wills filing administration (CWFA) team, a tangible personal property (TPP) team, an estate advisory specialist (EAS) team, and an estate tax team (ETT).

In a conventional system, each of the teams may use separate computing systems designed and directed toward their different tasks, and keep separate records for the respective portion of the decedent's estate. The separate computing systems of the different teams do not share information, and members of one of the teams do not have access to the computing systems or records of another one of the teams. Thus, in the conventional system, one team must rely on manual means to exchange information or check on the progress of the other teams with respect to their respective portions of the decedent's estate. In the conventional system, to obtain information or check on progress, a member of a first team typically emails, texts, calls, or otherwise messages a member of another team of the estate settlement services to request the information, which is time consuming, difficult to track and manage, and may violate privacy or security regulations.

In addition, from the perspective of a decedent's representative (e.g., the executor), working with the estate settlement services teams in a conventional system may include providing multiple copies of documents, repeating answers to the same questions multiple times, and receiving unclear and possibly conflicting answers from the different teams. Where the bank is the executor or trustee, or agent for the executor, this process may be inefficient. In the case where the decedent's representative may be a family member dealing with grief and overwhelmed already with the decedent's affairs, answering the same questions and being shuffled between teams for answers could be frustrating and traumatic.

The techniques described by this disclosure provide a centralized system to coordinate the disparate teams involved in settling or reconciling the affairs of a given estate. These techniques provide a centralized system to create, manage, track, and coordinate task checklists and actions for each of the teams including interactions between teams. The centralized system, according to the techniques of this disclosure, may assign specific personnel within each team to a given estate, send notifications and warnings to appropriate team members when tasks are due or complete, and facilitate messaging between team members to communicate when information is needed or has become available. The system may provide updated status and information across teams without violating privacy or security regulations, as may be the case with email, text messages, or voice messages. In addition, the system may provide a centralized repository for information, thus avoiding repeated queries for the same information and documents to the decedent's representative.

The techniques described by this disclosure allows an estate's representative to receive clear consistent instructions on what information the estate's representative should provide and what actions to take to resolve the affairs of an estate. The techniques, according to this disclosure, enable an estate's representative to provide a single copy of documentation, provide information only one time, and have a single point of contact that can provide consistent, accurate and up-to-date status on progress. Similarly, should an estate's representative contact a team member that is different than the designated point of contact, the techniques of this disclosure allow any team member with access to the account to provide the estate's representative the status and progress of the estate without the need to transfer or redirect the question. The techniques of this disclosure may serve to make the estate settlement process more efficient in general as well as provide reports and performance information across all the estate settlement services teams associated with the financial institution, to further improve the estate settlement process. The terms "bank" and "financial institution" may be used interchangeably in this disclosure.

FIG. 1 is a conceptual block diagram illustrating an example estate resource system that consolidates and manages estate settlement activities across a plurality of estate settlement services teams, in accordance with one or more techniques of this disclosure. An estate resource system 100 may interact with the plurality of teams involved in resolving the estate assets, as well as receive information from and transfer information to a variety of systems and services both within and external to the bank.

Estate resource system 100 may coordinate the efforts of a plurality of estate settlement services teams involved in resolving the affairs of a given estate. Estate resource system (ERS) 100 may include a centralized system to create, manage, track and coordinate checklists associated with an estate account from each estate settlement services team. The coordination and tracking may include interactions between teams. ERS 100 may be configured to assign specific personnel (i.e. a team member) within each of the teams to a given estate account, set up and control each assigned team member's authorized level of access for an estate account, and a provide notifications to the assigned team members when tasks are due, when tasks are completed, or when information is needed or available.

ERS 100 may interact with a variety of teams that may be involved with resolving an estate's affairs. The example of FIG. 1 depicts ERS 100 transferring information to and from an estate services liaison team (ESLT) 110, a tangible personal property (TPP) team 112, an estate settlement administration (ESA) team 114, a central wills filing administration (CWFA) team 115, an estate tax preparation (ETT) team 116 as well as other teams 118. In other examples, ERS 100 may interact with additional or fewer teams. Estate resource system 100 may be executed on a single computing device or across two or more computing devices in a network associated with the financial institution. Each of estates settlement services teams 110-118 may include one or more team member computing devices. For example, the team member computing devices may comprise terminals or computers operated by the team members and configured to log into ERS 100.

ERS 100 may receive information from and transfer information to a variety of other systems and processes both within and external to the bank. These other systems and processes may include investment and fiduciary services (IFS) 120, checking and savings 130, trust management 140 and other services 150. In some examples, a team member may manually enter information from one or more other systems or processes because ERS 100 may not receive the information systematically.

In some examples an "estate account" may be called a "relationship." An estate account, or "relationship," will generally represent one death (and a relationship team will be assigned to work on that individual's death-related accounts). In the example of FIG. 1, ERS 100 functions on an estate account or relationship level. Each death creates a new decedent "relationship". Eventually there are always some accounts (either new or existing) within each decedent's estate account, i.e. revocable trust, terminating irrevocable trust and similar accounts. Upon receipt of a death notification form (DNF), ESLT 110 may assign the estate account to an ESLT team member, which in some examples may also be called an ESLT administrator. The ESLT administrator may decide how to handle "existing" accounts within the estate account. For example, to manage the account through estate settlement process or to a termination group. "Existing" accounts, such as IFS 125 accounts, may automatically pull over into ERS 100 because they are tied to a decedent's social security ID. Sometimes not all existing accounts within one estate account will be directed to go through the estate services process. As one example, if there are no existing accounts but this is a new IFS business prospect, then the ESLT administrator may work with the client facing team member, such as a financial adviser in an IFS 120 role, to determine the bank's proposed role. If the proposed role is to perform death settlement, i.e. serve as trustee of a deceased grantor trust, as executor of a probate estate, or as Agent for death settlement. Then the ESLT administrator may vet the opportunity according to bank and compliance standards for new business. If accepted the estate account goes through an estate settlement process.

ERS 100 may include an estate account management unit 102 and a checklist manager unit 104, along with other components not shown in FIG. 1. Estate account management unit 102 may be configured to create an estate account for the decedent, and identify and associate financial accounts internal or external to a bank with the decedent's estate account. The financial accounts may be related to the decedent's asset categories. Some examples of asset categories include: trusts, agency, guardianship, brokerage, marketable securities, cash or cash equivalents, life insurance, annuities, retirement benefits, closely held interests, oil, gas or mineral interests, mortgages, promissory notes or other receivable notes, non-assets, debts, liabilities, loans, and funeral expenses. Assets may be held by a bank or by a third party.

In addition, estate account management unit 102 may automatically assign at least one team member of each of the estate settlement services teams 110-118, to the estate account for the decedent. In other words, estate account management unit 102, or another component of ERS 100, may be configured to manage the assignment of at least one team member of each of the plurality of estate settlement services teams to the estate account. In one example, estate account management unit 102 may assign a team member of each of the estate reconciliation teams based on a geographic state in which the decedent resided upon his or her death. In other examples, estate account management unit 102 may notify a team supervisor to assign a team member to a new estate account. In some cases, ERS 100 may be configured to manage assignment of the at least one team member of each of the plurality of estate settlement services teams 110-118 to the estate account.

Estate settlement may include many different steps and transactions. To ensure a complete service and that nothing important is missed, ERS 100 may develop one or more checklists. The items included in each of the checklists may indicate tasks or steps to be completed by team members of a respective one of the plurality of estate settlement services teams to settle the estate assets of the decedent. Checklist manager unit 104 may create, edit, manage, track and coordinate the task checklists for each of the estate settlement services teams 110-118, and interactions between the task checklists for the teams. Checklist manager unit 104 may also enable team members of each of the estate settlement services teams 110-118 to modify and/or view the task checklists.

Checklist manager unit 104 may be configured to generate the task checklists for the plurality of estate settlement services teams 110-118 based on the estate asset information for a given decedent. An estate account for the given decedent may differ greatly from an estate account for another decedent. As such, the tasks required to settle the estate account for the given decedent may be different than that of another estate account. In addition, certain checklist item details may have restricted access based on privacy, security or legal restrictions. Checklist manager unit 104, or another unit of ERS 100, therefore, may only allow an authorized team member of one of the plurality of estate settlement services teams to indicate that one or more of the tasks have been completed and/or store additional remarks, information, documents, and other items associated with the estate account along with the checklist.

For some tasks or steps included in a task checklist, it may not matter in which order the tasks are completed. But some tasks are conditional or depend on the results of other tasks or steps. ERS 100 may have significant advantages over separate, uncoordinated team checklists when checklist steps from a first team depend on checklist steps from another team. In some examples, checklists within ERS 100 are in sequential order. Checklist manager unit 104 within ERS 100 may prompt a user to seek approval for the situation where a user needs an exception to skip a step. Checklist manager unit 104 may prompt the user to get exception approval prior to that user being able to proceed with skipping the step and completing the checklist.

In the example of FIG. 1, checklist manager unit 104 manages the checklists such that each team's progress toward completion of their checklist may be visible to authorized team members of the other teams. Checklist manager unit 104 may update and manage a checklist for a first one of the estate settlement services teams based on input from at least one team member of the same first one of the estate settlement services teams. Checklist manager unit 104 may also update and manage the checklists for the other estate settlement services teams based on the updates to the checklist for the first one of the estate settlement services teams.

For example, the estate settlement services teams may need to verify that each team is working with the latest revision of the decedent's last will and testament. As one example, estate services liaison team 110 may proceed through the first few items in the estate services liaison team 110 checklist, but need to halt further steps until notified that the team has the most recent valid will. Checklist manager unit 104 may be configured to create a linkage between the checklist for estate services liaison team 110 and a central wills filing administration (CWFA) team 115. This checklist linkage may prevent estate services liaison team 110 from moving further until CWFA team 115 has verified and noted in the CWFA team 115 checklist in ERS 100 that the latest will is associated with the estate account in ERS 100. This may have the advantage of preventing unnecessary work, or preventing estate services liaison team 110 from taking action in accordance with a superseded will.

The example of FIG. 1 depicts ERS 100 interacting with the various estate settlement services teams. ERS 100 may be configured to assign a particular member of estate settlement services team to a particular estate account within ERS 100. ERS 100 may assign a member of estate services liaison team 110 in accordance with criteria within ERS 100. Alternatively, ERS 100 may send a notification to a manager within an estate settlement services team to notify the manager to assign a team member to a particular estate account. In other examples, ERS 100 may provide notification that a new estate account is available and as yet unassigned. A team member may manually select the new estate account based on workload, or other criteria. ERS 100 may update a status screen for the estate account that shows the assigned team member.

ERS 100 may generate an at least partially customizable checklist to track the status of ESLT 110 tasks for the estate account. A partially customizable checklist may include items that the team member may add or delete, depending on the situation of the particular estate account. For example, a team member may customize a checklist based upon if the decedent is a new or existing client, because there may be different regulatory or other compliance requirements for vetting each type of client. In other examples, ERS 100 may auto customize the checklist in that ERS 100 pulls over all existing accounts related to the decedent's social security number. Existing accounts may have specific requirements in the checklist for the ESLT administrator to address. If there are no existing accounts for a decedent, then ERS 100 would not pull over and auto customize the checklist.

Some example checklist items for an ESLT 110 member may include receiving a death notification, starting an estate account based on the death notification, and beginning to gather any governing documents. Death notification can come from a variety of sources, including the estate executor or another representative. The ESLT 110 member may request additional documents or information from the estate representative to help determine whether the bank should agree to assist the estate in settling the estate's affairs. For example, if a decedent had most of his investments and other affairs under management with a different bank, or had a simple account with few assets, the bank may decide not to handle the decedent's estate. ERS 100 may be configured to determine which information to request, and determine, based on an objective set of criteria, whether the bank should proceed with managing a decedent's estate. ESLT 110 may further notify the decedent's representative whether or not the bank will handle the estate's affairs. If the bank decides to handle the estate, ESLT 110 may proceed with further steps, including opening the estate account in ERS 100 and setting up relationships in ERS 100 between the decedent's estate account and team members of the estate settlement services teams.

Another example of an estate settlement services team may include the tangible personal property (TPP) team 112, which may include team members in one or more states, depending on where tangible personal property is located. ERS 100 may be configured to establish a relationship between the estate account for the decedent and at least one team member of a tangible personal property team 112 in each state containing estate property. Tangible personal property may include moveable property such as automobiles, pets, boats, firearms, collectibles, farm equipment and similar items. Items such as real estate or intangible personal property such as intellectual property, stocks and similar items may be handled by other teams. Further details of an example TPP team process will be described in FIG. 4 below.

If the business is accepted, Estate settlement administration (ESA) team 114 may perform a variety of steps during the settlement of an estate. ERS 100 may be configured to manage and track the actions of ESA team 114, including interactions with other teams and third party resources and actors. Some example of ESA team 114 checklist items may include reviewing the estate's assets and engaging a certified public accountant (CPA) and/or an attorney. ESA team 114 may interact with Estate Tax Team (ETT) 116 to help establish the cost basis for certain assets, provide information on gift taxes, close out income tax, and similar actions.

For estates with existing or testamentary trusts, ESA team 114 may coordinate actions with trust management department 140 or, as needed, third party trust management. ESA team 114 may contact beneficiaries listed in the will as well as prepare a plan to distribute assets. For estates without a will, or where certain assets are not covered by a valid will, the checklist for ESA team 114 may also include arranging for any required notices, including public notices. ESA team 114 may also need to contact government services such as the Veteran's Administration, Social Security, as well as other providers of retirement or disability benefits. The checklist for ESA team 114 may also include paying any funeral expenses, creditors or other debts and ensuring the taxes for the estate have been paid before making final distributions to beneficiaries. The ESA team 114 checklist may include other steps not specifically mentioned in this disclosure.

ESA team 114 may be the team assigned as the point of contact with the decedent's representative (e.g., executor) and beneficiaries on certain account types (e.g., those accounts below a certain market value). On accounts over a certain market value, an estate advisory specialist will serve as the initial primary point of contact for the relationship beneficiaries. It may be beneficial for both the financial institution and for the decedent's representative and beneficiaries to have a single, consistent point of contact between the financial institution and the estate. A consistent point of contact with ERS 100 may enable more efficient and accurate status reports to the estate's representative. Limiting direct communication to ESA team 114 or an estate advisory specialist may also provide a degree of comfort to an estate's representative that a request for details associated with the estate is a legitimate request, rather than an attempt at fraud or identity theft. If another team requires further information, ERS 100 may notify ESA team 114 to contact the estate's representatives and collect the information. Limiting such requests for information to a central point of contact may also prevent an estate's representative from receiving requests for duplicate information from ERS 100. ERS 100 may store copies of needed information and make the information available to an authorized team member.

By making the checklist progress of ESA team 114 available to the other teams, ERS 100 may have significant advantages over separately maintained checklists stored in separate team folders or files. ERS 100 may maintain the information gathered by ESA team 114 from the decedent's representative and/or bank services 120-150 in a central, secure location with different levels of access as needed to protect privacy or meet other requirements. ERS 100 may also send notifications to other teams when certain documents or information is available. ERS 100 may be configured to automatically forward notifications to other team members if the primary team member for the relationship is out sick or on vacation. These functions may be difficult, impractical or impossible without a system such as ERS 100.

Estate tax team (ETT) 116 may coordinate with appraisers, CPAs, federal, state and local agencies to review and analyze asset information and calculate taxes for an estate. ERS 100 may be configured to include interactions with several other teams and processes to both gather information and to place holds on certain steps in other team's checklists until the certain E116 steps are complete. For example, the ESA 114 checklist may include an item that prevents any ownership transfer of real property until the ETT 116 determines the tax status of the real property. ETT 116 may also include extra checklist items if there are assets or tax liabilities in foreign countries.

For example, a first estate account may request the financial institution's estate tax team (ETT) 116 handle the taxes for estate account. A second estate account may have their own outside accountant handle the taxes for the second estate account. The ETT 116 team member may customize the checklist for the first estate account to include liaison steps and follow up actions involving ETT 116. For the second estate account, the ETT 116 team member may customize the checklist to include contact information for the outside accountant, confidentiality agreements between the outside accountant and the financial institution along with other steps that differ from the first estate account using ETT 116.

Other teams 118 may include interactions with other teams internal and external to the bank. Some examples may include closely held interests, oil, gas or mineral interests, mortgages, safety deposit boxes, promissory notes or other receivable notes, outstanding court judgments that have not yet been awarded as well as other non-IFS assets, debts, liabilities, and loans. ERS 100 may manage checklists of and track actions and processes to resolve, collect, distribute or dispose of these items as depicted by the example of FIG. 1.

ERS 100 may receive information from and transfer information to other systems and processes outside the estate reconciliation function. In other words, ERS 100 may be configured to retrieve the estate asset information of the decedent from at least one of the financial institution or a representative of the decedent. One such service may include investment and fiduciary services (IFS) 120. IFS 120 may include one or more databases of IFS accounts 125. IFS 120 may work with bank customers to advise and assist with bank customer's investment portfolio. IFS 120 may include both strategic and tactical portfolio management to monitor risk. IFS 120 may communicate with ERS 100 to ensure ERS 100 includes all of the decedent's assets. ERS 100 may collect other details from IFS, such as any special beneficiary designation for certain IFS accounts. This beneficiary information may not be included in a decedent's will, but may still need to be included as part of estate account managed by ERS 100.

In the example of FIG. 1, checking and savings accounts 130 may include a variety of business or consumer accounts. These accounts may include certificates of deposit (CD), money market accounts and individual retirement accounts (IRA). Information about checking and savings accounts 130 may be tracked by one or more account databases 135 or via an asset listing contained in the ERS tool. Account databases 135 may track account ownership, balance, transfer of funds, expenditures, receipts and other information. Checking and savings accounts 130 may communicate with ERS 100 to ensure that ERS 100 associates all accounts owned or jointly owned by the decedent with the decedent's estate account in ERS 100. Similarly, checking and savings accounts 130 may receive notifications from ERS 100 of decedent's death and the eventual disposition of the funds in any of the accounts associated with decedent's estate account in ERS 100. In other examples, checking and savings accounts 130 may not directly communicate with ERS 100. A team member may manually enter the information from one or more other systems or processes to ERS 100, such as from IFS 120, checking and savings accounts 130 or other systems.

ERS 100 may also communicate with trust management accounts 140. Trust management accounts 140 may include trust account database 145. A decedent's estate may include trusts where the estate is either a donor or a beneficiary of the trust. Trust management accounts 140 may provide a range of trust and discretionary asset management services tailored to the circumstances of each trust account. Trust management accounts 140 may include trust and fiduciary specialists and investment strategist who may design and implement an investment process to help achieve the financial objectives of the trust. The bank may act as a trustee to invest and disburse trust assets in accordance with the trust purpose and objectives. Similar to checking and savings accounts 130, trust management accounts 140 may communicate with ERS 100 to ensure that ERS 100 associates all accounts owned or jointly owned by the decedent with the decedent's estate account in ERS 100. Trust management accounts 140 may also receive notifications from ERS 100 of decedent's death and the eventual disposition of the funds in any of the accounts associated with the decedent's estate account in ERS 100. In other examples, accounts to be reclassified after a decedent dies, such as to close an account or change the servicing entity to ESA team 114 or ESLT 110, may proceed via a different process and the results entered manually into ERS 100.

Other services 150 may include those services internal and external to a bank. Other services 150 may range from financial and life management services to managing nonfinancial assets that are included in the client's full balance sheet portfolio. Some examples of external services may include life insurance companies, property management, other investment services such as mutual fund management companies and similar services. Information transfer to external services may be via secure electronic links or other methods. For example, a bank team member may coordinate transactions with a property management company to sell or otherwise transfer ownership of a piece of property via telephone, fax, mail or similar services. Another example may be a life insurance company that directly deposits funds into a customer's account. ERS 100 may support and track these transactions. For example, ERS 100 may include the templates to send or request information by mail or fax, as well as to track the time and date of any communications. ERS 100 may send notifications, or otherwise update the teams about any external communications.

An estate resource system, such as example ERS 100 depicted in FIG. 1, may have advantages over individual teams managing their own checklists and action items using a shared common file server, file sharing application, such as SharePoint, or similar separate checklists. For example, ERS 100 may expedite the estate settlement process because ERS 100 can serve as a centralized location for the estate settlement process, which may result in the end-to-end estate settlement process taking less time to reach settlement. This in turn may enable the various teams to increase the number of estates settled annually as well as deliver an efficient client/customer experience, which may result in asset retention from the beneficiaries of an estate. A centralized, coordinated and linked system, such as ERS 100, gives transparency of the status of an estate across all teams, which may result in better customer service. A linked system, such as ERS 100, may provide a robust search function that may allow members of the estate settlement services teams to find needed documents, task status, contact information and other such search items.

As another advantage, ERS 100 may be configured to accept, and in some examples solicit, feedback on how to improve ERS 100 and the estate settlement process in general. ERS 100 may allow direct reporting and messaging out of the ERS 100 tool to report estate reconciliation performance and process bottlenecks to an administrator of ERS 100. The centralized ERS 100 may generate reports for the administrator of ERS 100 that may analyze the efficiency of completing an estate reconciliation team task checklist and identify steps that may cause delays. This direct reporting may allow bank management and team members to further improve the estate settlement process, something that would not be possible with separate, individual tracking. A centralized ERS may also include a system change request feedback unit where team members, clients and others may suggest, track and implement improvements to the ERS.

Figure 2:
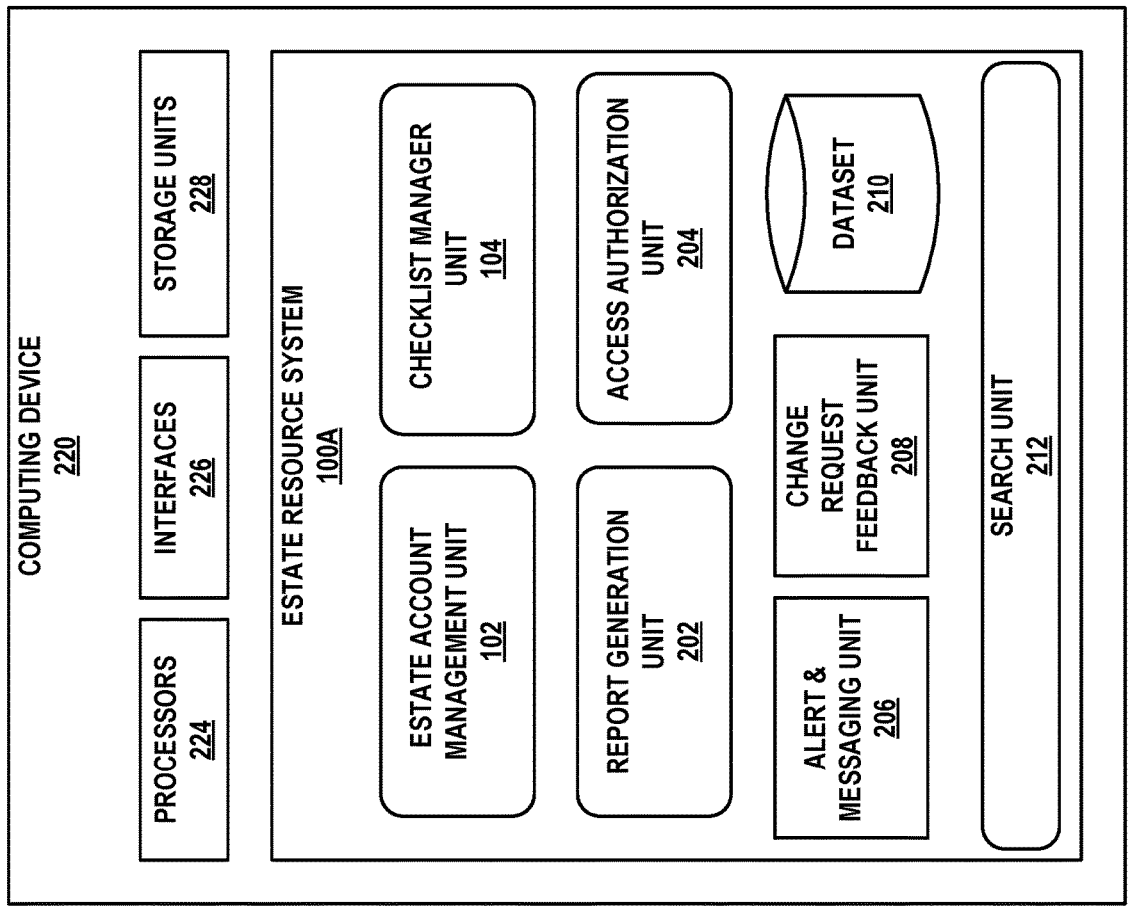
FIG. 2 is a conceptual block diagram illustrating an example computing device that may implement an estate resource system, in accordance with one or more techniques of this disclosure.

FIG. 2 is a conceptual block diagram illustrating an example computing device that may implement an estate resource system, in accordance with one or more techniques of this disclosure. FIG. 2 illustrates example ERS 100A, which is similar to ERS 100 as shown in FIG. 1. Components that represent the same functions as those shown in FIG. 1 may have the same reference number. Other examples of ERS 100A may include more or fewer components than those depicted in FIG. 2.

Example computing device 220 may include one or more processors 224, interfaces 226, storage units 228 and may implement ERS 100A. ERS 100A may include estate account management unit 102, checklist manager unit 104, report generation unit 202, access authorization unit 204, alert and messaging unit 206, change request feedback unit 208, dataset 210, and search unit 212.

Example computing device 220 may be implemented as a single computer, one or more server computers or other similar arrangement. Computing device 220 represents an example of a computing device including interfaces 226 configured to send and receive data via a network as well as to one or more display units, and one or more processors 224 configured to manage the data for access by a plurality of other devices on the network.

Processors 224 may represent one or more processing units, such as a single hardware-based processor, multiple cores of a processor, multiple processors operating together, digital signal processors (DSPs), application specific integrated circuits (ASICs), field programmable gate arrays (FPGAs), or any combination thereof. In general, processor 120 is implemented as, or at least includes, hardware-based elements, such as processing circuitry (e.g., computer chips, including logic circuitry, formed on silicon dies). Processors 224 may execute the software that implement ERS 100A, including centralized management of estate accounts, filtering data based on the authorization level of team members, determining and displaying progress of the estate account, sending alerts and notifications as needed, coordinating the sending and receiving of information to other systems, such as through interfaces 226, storing and retrieving information from storage units 228, and other functions.

Interfaces 226 may include one or more interfaces for communicating via a network. Interface 226 may represent, for example, one or more of a network interface card (MC), a radio for communicating over a radio access network (RAN), a wireless network card (which may conform to one or more IEEE 802.11 standards), or the like, alone or in any combination. Interfaces 226 may also represent connections to send and receive information to other components within computing device 220, such as interfaces to storage units 228, or user input devices such as a keyboard and display devices. Processors 224 may be configured to present a graphical user interface (GUI) on a display unit operatively coupled to computing device 220. The GUI appearance may be different for different team members depending, for example, on the team member's level of access and which team the team member is assigned. An example GUI will be discussed in more detail in FIG. 5.

Storage units 228 may represent one or more of any of a variety of random access memory (RAM), read-only memory (ROM), and/or long-term storage memory, alone or in any combination. Some examples may include solid state drives, hard disk drives, arrays of hard disk drives or some combination. In some examples, storage units 228 are used to store program instructions for execution by processors 224. Storage units 228 may be used by software or applications running on computing device 220 (e.g., ERS 100A) to temporarily store information during program execution. For example, storage units 228 may be configured to store information related to estate assets associated with an estate account of a decedent of the financial institution. Storage units 228 may also store the task estate settlement services team checklists and checklist status associated with the estate account.

Estate resource system (ERS) 100A performs the same functions as described in FIG. 1 above. ERS 100A may include account estate account management unit 102 and checklist manager unit 104, which also perform the same functions as described in FIG. 1. For example, processors 224 may use checklist manager unit 104 to notify a first team that a task step that is conditional on a task from second team is available for completion. For example, a team member from a first team may view their team checklist in the GUI and note that a task is not available, or 'locked' because the task needs input from another team. The GUI may indicate the task is locked by displaying the task as 'greyed out' and not selectable, displaying a caution symbol next to the task, or in some other manner. Based on the second team completing their task, ERS 100A may cross-reference the completed task on the second team's checklist and unlock, add or otherwise notify the first team, via checklist manager unit 104, that the first team's conditional task may now be started. In some examples checklist manger unit 104 may add the task to the first team's list, remove the caution symbol, or change the font color from a grey to another color to indicate that ERS 100A has released the lock on the conditional task and the task is now available. In some examples, processors 224 may use alert and messaging unit 206, discussed below, notify other teams that a conditional task is available.

ERS 100A may also include report generation unit 202. Report generation unit 202 may collect information from other components of ERS 100A and generate one or more reports. Report generation unit 202 may be configured to generate progress reports for the plurality of estate settlement services teams, with each of the progress reports indicating progress towards completion of a respective task checklists. The progress reports may be viewable by the at least one team member of each of the plurality of estate settlement services teams having authorized access to the estate account.

Some example reports may include an estate settlement status report depicting each teams progress with each team's checklist. Other examples may include alerts and upcoming and past due deadlines. Bank management and individual teams may review system performance reports that depict the efficiency and execution of the estate settlement process. For example, a system performance report may include how long it took to assign a team member to a relationship, how many deadline tasks each team completed early or on time and other performance factors. Such reporting may not be possible without a comprehensive, linked system to coordinate and track an estate settlement process.

Access authorization unit 204 may manage and compartmentalize the levels and areas of access for team members. Administrators may control which team members may access which information to comply with privacy and security regulations or policies. For example, the tangible personal property team 112 may have no need to know details of a client's tax status. Access authorization unit 204 may authorize a TPP team 112 member to view certain items on the ETT 116 checklist, but prevent the TPP team 112 member from seeing details or documents associated with the ETT 116 checklist. In some examples, Access authorization unit 204 may manage access for a user of ERS 100A based on the user's business need to know the estate services business.

Access authorization unit 204 may be configured to allow a team member of one of the estate settlement services teams to modify one of the task checklists. For example, a TPP team 112 member from Virginia may be authorized to modify a TPP team 112 checklist item for, "inventory TPP items in Virginia." Access authorization unit 204 may allow the same TPP 112 team member to view checklists for other teams, but prevent the same TPP 112 team member from modifying items on the other checklists, e.g., the ESLT 110 checklist.

Alert and messaging unit 206 may perform a variety of automated and manual messaging tasks. In one example, alert and messaging unit 206 may send an email, text message or other notification to a team member with an upcoming or past due deadline. Alert and messaging unit 206 may generate an alert, such as a visual caution sign or some other visual or auditory indicator along with periodic reminders, when a form is not submitted by due date, for example. Alert and messaging unit 206 may send the alert to a team member computing device via interfaces 226 for display to the team member. Alert and messaging unit 206 may clear the indicator when the checklist item is cleared.

Alert and messaging unit 206 may be configured to generate notifications of task due dates according to one or more of the task checklists of the estate settlement services teams and may send the notifications to the at least one team member of a team. Computing device 220 may send notifications through one or more interfaces 226. One example notification may include an automated message to TPP team 112 that certain checklist items from ESLT 110 are complete, which may allow TPP team 112 to continue with other items on their checklist. For example, ESLT 110 may have received approval to proceed with the decedent's estate settlement. Once ERS 100A has this approval, alert and messaging unit 206 may send an automated message to TPP team 112 to contact appraisers in the one or more states where the decedent has property so the appraiser can begin cataloging and valuation.

Alert and messaging unit 206 may also be configured to provide a communication platform for at least one team member of the estate settlement services teams over which to communicate with one or more of a representative of the decedent, other team members of other estate settlement services teams, or an administrator of ERS 100A. For example, alert and messaging unit 206 may include functions to send manual messages between team members, such as requests for information or answers to questions. In another example, ERS 100A may be configured to authorize only one team member of one of the estate settlement services teams to communicate with the representative of the decedent via the communication platform. Communicating with only one team member, may provide consistent information to the representative and avoid confusion. Alert and messaging unit 206 may have the advantage of automatically retaining the manual or other communications linked to the estate's account. Such coordination and cross-linking information may provide advantages over individually maintained spreadsheets or a shared file location.

Change request feedback unit 208 may be configured to accept, and in some examples solicit, feedback on how to improve ERS 100A and the estate settlement process in general. Change request feedback unit 208 may be configured to send a notification to team members, or others, including beneficiaries, estate representatives, and the like, at some point in the estate reconciliation process to solicit a system change request or other feedback. One example point in the process may be at the completion of all the reconciliation steps for an estate. Team members, and others, may submit system change requests, suggestions or complaints in response to the solicited feedback request, or on their own initiative. Change request feedback unit 208 may be configured to track each input along with the resolution and status of each system change request. For example, a team member may submit three system change requests. Two may be fairly simple updates that may be implemented quickly. The other may be either difficult and require more time or be deemed impractical because it negatively impacts a different team. Change request feedback unit 208 may retain this information so team members and system administrators may coordinate and track improvements.

Dataset 210 may retain the estate accounts along with information received from other systems or directly entered into ERS 100A. In other words, ERS 100A may be configured to retrieve the estate asset information associated with the estate account of the decedent from at least one of the financial institution or a representative of the decedent and store the information in dataset 210. Some examples may include beneficiary information, all accounts related to the estate, contact information for third parties, such as property managers and similar information. Dataset 210 may provide a single storage location across the teams to avoid repeated or conflicting information. Dataset 210 may interact with access authorization unit 204 to manage access to portions of the data.

Search unit 212 may provide team members the functionality to search ERS 100A for information. In some examples access to search unit 212 may be from within a user interface for ERS 100A, such as from the ribbon bar, as shown in the user interface depicted by FIG. 5 below. Some example searches may include the name of the decedent for a given estate account, the name of a beneficiary, the name of a team member, a real property address or keyword search for the description of an item of personal property.

An ERS, such as ERS 100A, as described in this disclosure may be implemented using variety of hardware and software solutions. A first example may include a standalone custom application implemented using any combination of html, C++, Java or other programming code executed by computing device 220. An ERS may also be implemented on a computing device, such as computing device 220, or similar device by using a browser-based collaboration and document management platform such as SharePoint from Microsoft, Inc. For example, the techniques of this disclosure may be incorporated into a team collaboration page and implement an ERS by customizing workflows and other built-in functions of the collaboration platform. An ERS may be implemented in hardware by using components such as application specific integrated circuit (ASIC), field programmable gate array (FPGA), hardware storage devices, interface devices and other components in any combination.

Figure 3:
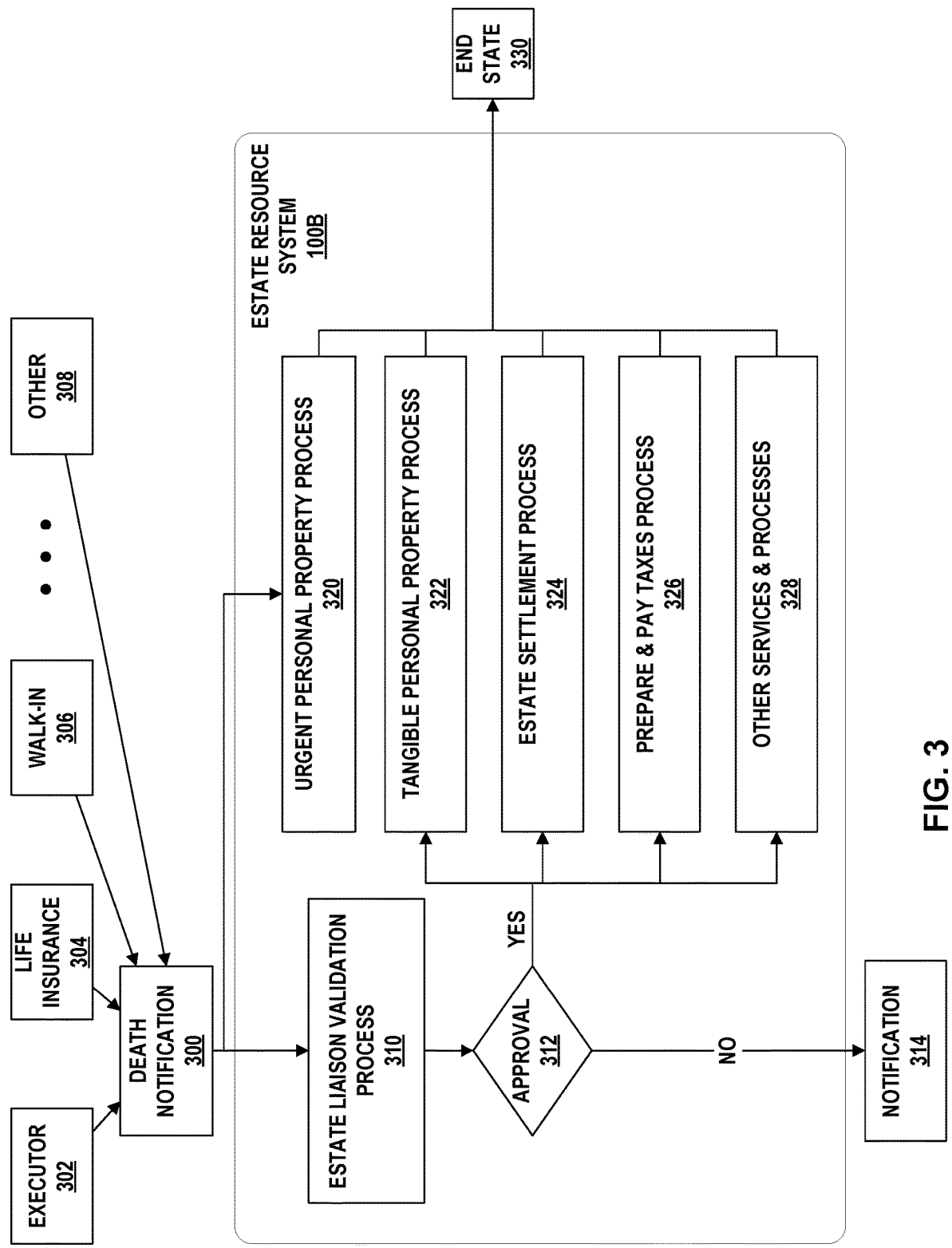
FIG. 3 is a flow diagram illustrating some examples of functions an estate resource system may consolidate and manage in accordance with one or more techniques of this disclosure.

FIG. 3 is a flow diagram illustrating some examples of functions an estate resource system may consolidate and manage in accordance with one or more techniques of this disclosure. ERS 100B depicted in FIG. 3 is similar to ERS 100 and 100A from FIGS. 1 and 2 and performs the same functions.

Death notification 300 may reach the bank from a variety of sources. In one example the estate's representative, such the estate's executor 302 may notify the bank. In other examples the decedent's life insurance company 304 may contact the bank, a relative may walk in 306 to a bank branch and report the death or by some other means 308. In any case, death notification 300 may then enter ERS 100B and begin the initial estate settlement process.

If the decedent has personal property that needs immediate attention, ERS 100B may initiate urgent personal property process 320. Some examples of urgent personal property may include if the decedent lived in assisted living or convalescent care, or if the decedent had animals that need immediate attention. A convalescent care facility may have a time limit as short as seven to 30 days to clear any personal effects from the premises. If the decedent had animals, such as livestock or pets, the animals may need to be fed or otherwise cared for without delay. In either case urgent personal property process 320 may include setting up arrangements to manage these affairs.

ESLT 110, shown in FIG. 1, may perform estate liaison validation process 310. After receiving death notification 300, estate liaison validation 310 may include creating an estate account request and requesting additional documents or information from the estate representative to help determine whether the bank should agree to assist the estate in settling the estate's affairs.

After collecting and validating any required information the ESLT 110 may complete estate liaison validation process 310 by submitting the estate account request for approval 312. The approval process 312 may consider an objective set of criteria to determine whether the bank should proceed with managing an estate's affairs. If not approved, the bank may send notification 314 to the estate's representative that the bank will not handle the estate's state settlement and will decline the fiduciary role.

If approved, ERS 100B may proceed with further steps, including creating an estate account for the decedent, and setting up relationships within ERS 100B between the estate account and other estate settlement services teams, depending on the needs of the estate.

Tangible personal property 322 process may handle items such as automobiles or other property owned by the estate. Tangible personal property 322 within an ERS, such as ERS 100B will be discussed in more detail in FIG. 4 below.

Estate settlement process 324 may include a number of steps and significant interactions with the decedent's representative (e.g., executor 302), other teams, and third party resources, as discussed in FIG. 1 above. Some example steps may include engaging a certified public accountant (CPA), and interacting with ETT 116 and the trust management department 140. The estate settlement administration team 114 may work through the steps of estate settlement process 324. Estate settlement process 324 may also include contacting beneficiaries and heirs, as well as government services such as the Veteran's Administration and Social Security. An estate settlement services team member may update the estate account for the decedent within ERS 100B to include contact information for parties outside the bank, documents sent to or received from government services or other institutions, results of communications with estate representatives or other organizations and similar information related to the estate account. This may have the advantage of collecting all information in a central location, avoiding duplicate requests for documents and information, and providing all estate settlement services teams with consistent and updated information on the status of the estate account.

Prepare and pay taxes process 326 may include coordinating with appraisers, CPAs, federal, state and local agencies to review and analyze asset information and calculate taxes for an estate, as described above in FIG. 1. ETT 116 may manage prepare and pay taxes process 326. Prepare and pay taxes process 326 may include interactions with the checklists for other estate settlement services teams that prevents any transfer of property ownership until the ETT 116, as described in FIG. 1, determines the tax status of the property. If a particular estate account decides to have an outside accountant manage the estate's taxes, prepare and pay taxes process 324 may be omitted and ERS 100B may include some interface steps with the outside accountant on, for example, the estate settlement process 324.

Other services and processes 328 may include other steps not specifically mentioned in this disclosure. Some examples may include resolving ownership of closely held interests, oil, gas or mineral interests, mortgages, promissory notes, partnerships and other assets or liabilities. ERS 100B may include links between task checklist steps within other services and processes 328 and estate settlement 324 or prepare and pay taxes 326.

The end state 330 for each estate may depend on the situation of each estate. ERS 100B may be configured to customize, add, delete and ignore certain items that do not apply to a given estate. For example, for an estate with no urgent personal property, ERS 100B end state 330 would not include a final urgent personal property 320 checklist. A comprehensive, coordinated ERS, such as ERS 100B, may have advantages over other techniques for estate settlement in that ERS 100B may help ensure both that estate settlement actions do not get overlooked, and avoid unnecessary work for items that do not apply to a given estate.

Figure 4:
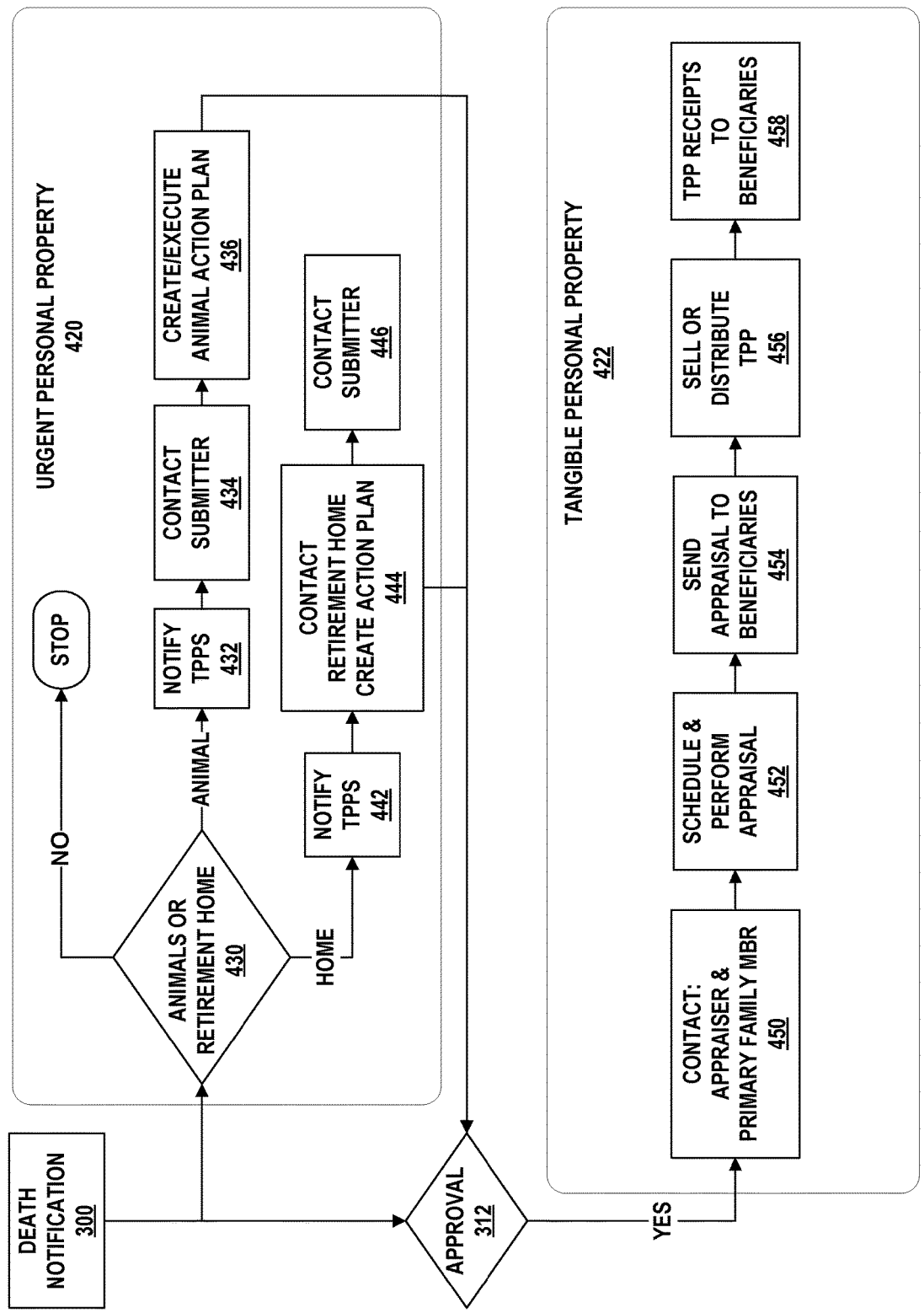
FIG. 4 is a flowchart illustrating further details of a tangible personal property process that an estate resource system may consolidate and manage.

FIG. 4 is a flowchart illustrating further details of a tangible personal property process that an estate resource system may consolidate and manage. The urgent personal property process 420 and tangible personal property process 422 are similar to urgent personal property process 320 and tangible personal property process 322 depicted in FIG. 3. Other items in FIG. 4 that perform the same functions as components from other figures may retain the same identification number, such as death notification 300.

As described in FIG. 3, urgent personal property process 420 may manage personal property that needs immediate attention. An ESLT member, or other estate settlement services team, may determine the decedent requires urgent personal property process 420. The team member may determine whether the decedent has animals or was living in a retirement home 430. A retirement home, as depicted in the example of FIG. 4 may also include hospice care, convalescent care, assisted living or other similar arrangements. If the answer to both animals and retirement home is no, then urgent personal property 420 may stop.

If the team member determines the decedent had animals in need of care, the team member may update the checklist to indicate animals to the ERS. This indication of animals may initiate an automated process that may include notify a tangible personal property specialist (TPPS) (432). TPPS may contact submitter 434 to create and execute an animal action plan 436. This may include moving the animals to a location where the animals may receive care or setting up care for the animals at the animal's location. The final animal action plan and status may then be entered into the ERS and may be considered during the approval process 312. Urgent personal property process 420 within an ERS may have the advantage of alerting the estate settlement services teams that the estate account may include personal property in more than one state and therefore be able to develop a more comprehensive animal action plan.

In some examples, submitter 434 may be the estate's representative or executor, a relative or other person associated with the decedent. In other examples submitter 434 may include a bank employee or other client facing partner. For example, a decedent's financial advisor may receive notice a customer's death while working in the financial advisor role. The financial advisor may submit a death notification to the bank as submitter 434.

If the team member determines the decedent was at a retirement home, the team member may indicate retirement home and any known time limit to the ERS. This indication of animals may initiate an automated process that may include notify TPPS (442). TPPS may contact the retirement home to create an action plan 444. TPPS may contact the submitter 446 to finalize and begin execution of the action plan. The final retirement home plan and status may then be entered into the ERS and may be considered during the approval process 312.

As described above, tangible personal property process 422 may begin after approval 312. Tangible personal property process 422 may include contacting appraisers and a primary family member 450. Appraisers may be in more than one state or region, depending on where the decedent's personal property is located. The primary family member may include the estate representative, executor or another person responsible for the decedent's tangible personal property.

The appraisers may work with the primary family member to schedule and perform the appraisal 452. TPPS may enter the appraisal results into the ERS. Entering the appraisal into the ERS may include filling in data forms, a spreadsheet and/or scanning or uploading appraisal documents into the ERS. Schedule and perform appraisal 452 may also trigger certain actions by other team members, such as ETT 116. The ERS may automatically notify ETT 116 that the ERS contains the estate's appraisal results.

TPP team 112 may use ERS 100 to identify and obtain addresses for beneficiaries and send the appraisal to the beneficiaries 454. Depending on the instructions in the will, and the desires of the beneficiaries, TPP team 112 may assist with selling or distributing any tangible personal property (456) and track the results in the ERS. One of the final tasks in tangible personal property process 422 may including sending receipts to beneficiaries (458).

The tangible personal property process illustrated by FIG. 4 is just one example to illustrate details of an estate settlement process. Tangible personal property process 422 may include additional or fewer steps. The other processes illustrated in FIG. 3, such as estate settlement process 324, may include similar detailed steps as shown in FIG. 4 for tangible personal property process 422.

Figure 5:
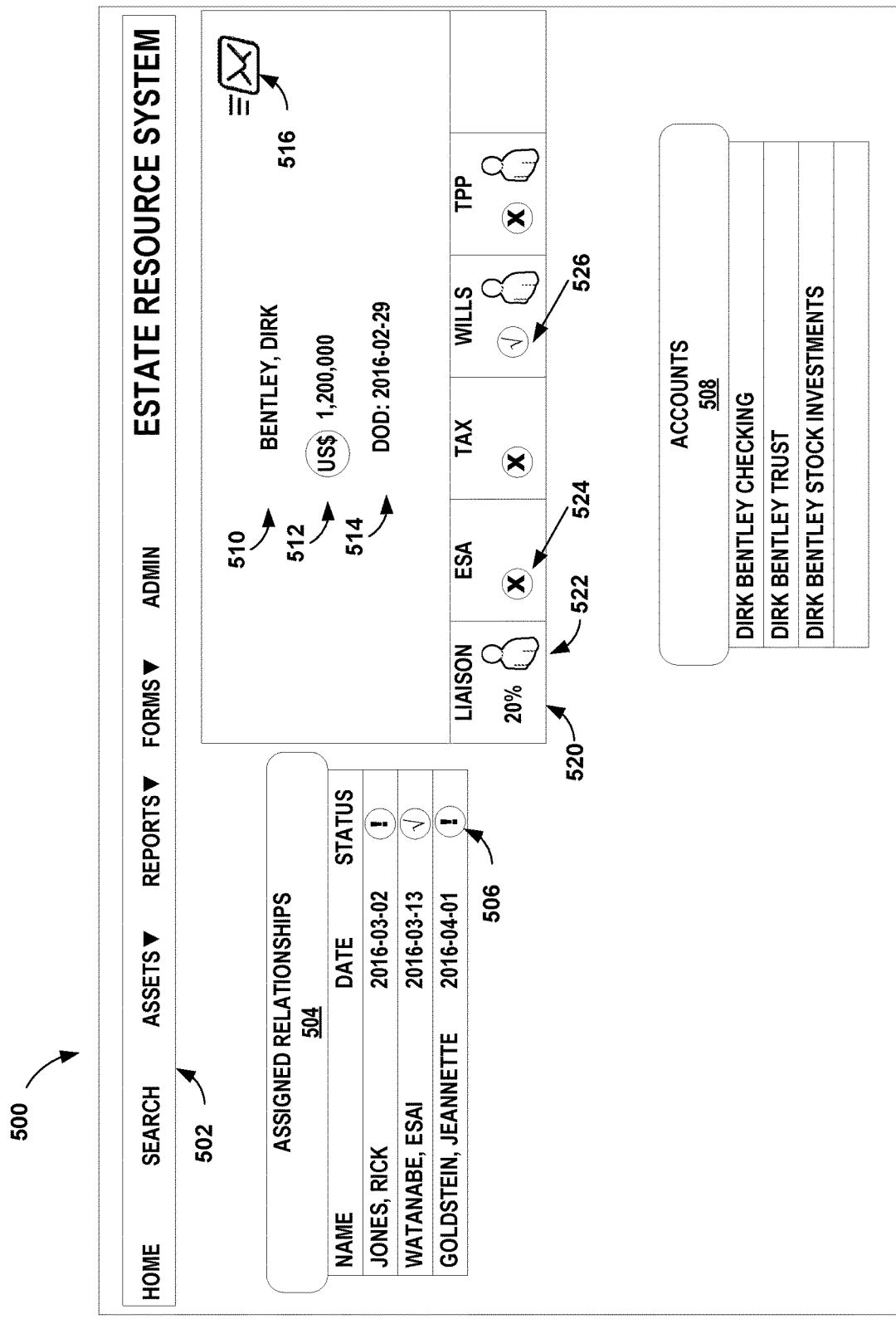
FIG. 5 is a conceptual diagram illustrating an example ERS estate account summary display in accordance with one or more techniques of this disclosure.

FIG. 5 is a conceptual diagram illustrating an example ERS estate account summary display. Estate account summary display 500, as depicted by FIG. 5, is an example graphical user interface (GUI) on a display unit that may be operatively coupled to computing device 220, as described in FIG. 2. Once a team member logs into the ERS, state account summary display 500 may provide any team member with access to see an overview of current status of an estate going through an estate settlement process. The GUI appearance may be different for different team members depending, for example, on the team member's level of access and which team the team member is assigned. Team members may retrieve additional information as needed starting from the summary page.

Estate account summary display 500 may include a menu bar 502, assigned relationships 504, accounts 508 along with an overview of the estate account and status of progress. The overview may include the decedents name 510, estate net worth 512, date of death (DOD) 514 and the progress of each assigned team's checklist.

The overview may include icons and symbols to quickly indicate status and what action might be needed. As one example, the estate services liaison team status box may include a person icon 522 which may indicate that a liaison has been assigned to the estate account. A team status box with no person icon 522 may indicate that a team member still must be assigned to this estate account. An authorized team member may be able to retrieve additional information from the summary page. For example, an authorized team member may select person icon 522, which may display name and contact information for the ESLT 110 member assigned to this estate account. In the example of FIG. 5, the estate settlement administration (ESA) team and ETT box (TAX) do not show a person icon 522. This may indicate that the TAX and ESA teams still need to assign a team member for this estate's account.

Other icons may include a checklist complete icon 526, which may indicate that the central will filing team checklist (WILLS) has been completed. A percentage completed indicator 520 may indicate that the estate services liaison team (LIAISON) checklist is 20% complete, in the example of FIG. 5. An X icon (524) may indicate that a team's checklist has not yet been started, that the checklist has been started but is not yet complete, or that there is some other problem with a checklist. For example, the tangible personal property team status box (TPP) includes an X icon 524 and a person icon 522. This may indicate that a team member has been assigned to the decedent's estate from the TPP team, but that team has not yet begun their checklist. Some icons may also be color coded. For example, checklist complete icon 526 may be in green while X icon 524 may be in red or yellow to indicate an issue to resolve.

Estate account summary display 500 may include symbols and icons that perform a variety of functions. As one example, 'send message' icon 516 may activate the alert and messaging unit 206, described above in FIG. 2, to allow a team member to send a message to another team within the ERS. As described above, messages sent within an ERS may have the advantage of automatically retaining the communication within the ERS and linked to the estate's account. This may have advantages over using an external email or other messaging system that does not automatically retain and link communications to the affected estate's account. For example, other team members may be able to quickly find answers to previously asked questions and avoid asking the same questions. Management and system administrators may be able to use these communications to identify bottlenecks and improve system and process efficiency. In the event of a lawsuit, information related to an estate's account may be found easily during the discovery phase of a lawsuit.

In some examples, the send message icon 516 may simply activate an external email application that may send messages external to the ERS. For example, send message icon may open a new message in the external email program and populate certain fields in the email, such as the subject line, with information pulled from the estate account.

Menu bar 502 may include additional functions and information. Some examples, as shown in FIG. 5, include home, search, assets, reports, forms and admin. Menu bar 502 may include additional or different items not shown in FIG. 5, or fewer items. A 'home' function may bring a user to a start screen, such as the estate account summary display 500. A 'search' function may allow the user to search for certain terms or phrases. Search unit 212, depicted in FIG. 2, may manage the search function for the ERS. In some examples, the items in menu bar 502 may depend on the level of user access. For example, not all team members may see the "admin" function.

The 'assets' function may include a pop-down list to display the various categories of assets linked to the account. Some examples may include tangible and intangible personal property, real property, stock, mutual fund or other accounts, along with other assets described above. The assets function may limit the available detail displayed depending on the access level of the user as controlled by asset authorization unit 204 described in FIG. 2. The asset information retrieved by the asset function may be stored in ERS dataset 210, or provide further direct access to other systems such as IFS accounts 125, described in FIG. 1.

The 'report' function in menu bar 502 may activate report generation unit 202. The report function may include a pop-down list of reports as described by FIG. 2. One example may include a report listing alerts, upcoming deadlines, and past due deadlines. The report function may also include the ability to generate custom reports. The report function may also be limited depending on team member access by access authorization unit 204 to comply with privacy and security regulations or policies.

The 'forms' function may allow user access to a variety of forms used by the various teams. One example may include a notification letter to beneficiaries. The 'admin' function may include functions available to system administrators, such as adding new team members, updated or changing a team member's access level, adding or deleting relationships, accounts and other such functions.

Assigned relationships 504 may indicate which team members of the different estate settlement services teams have been assigned to the estate's account. The listing may include a name, date assigned and a status indicator 506 for the respective assigned team member. As one example, an exclamation point icon may indicate a caution, or that something needs to be resolved with the relationship. For example, the ERS may assign a relationship for the estate account to Jeanette Goldstein, but Jeannette has not yet acknowledged the assignment.

Accounts 508 may list all financial accounts associated with the estate account. The example of FIG. 5 depicts three other accounts associated with the example decedent estate account. A more complex estate may have additional accounts. An authorized team member may be able to retrieve additional details about the financial accounts, such as account number, account location, balance, activity or other information by selecting one of the financial accounts.

Figure 6:
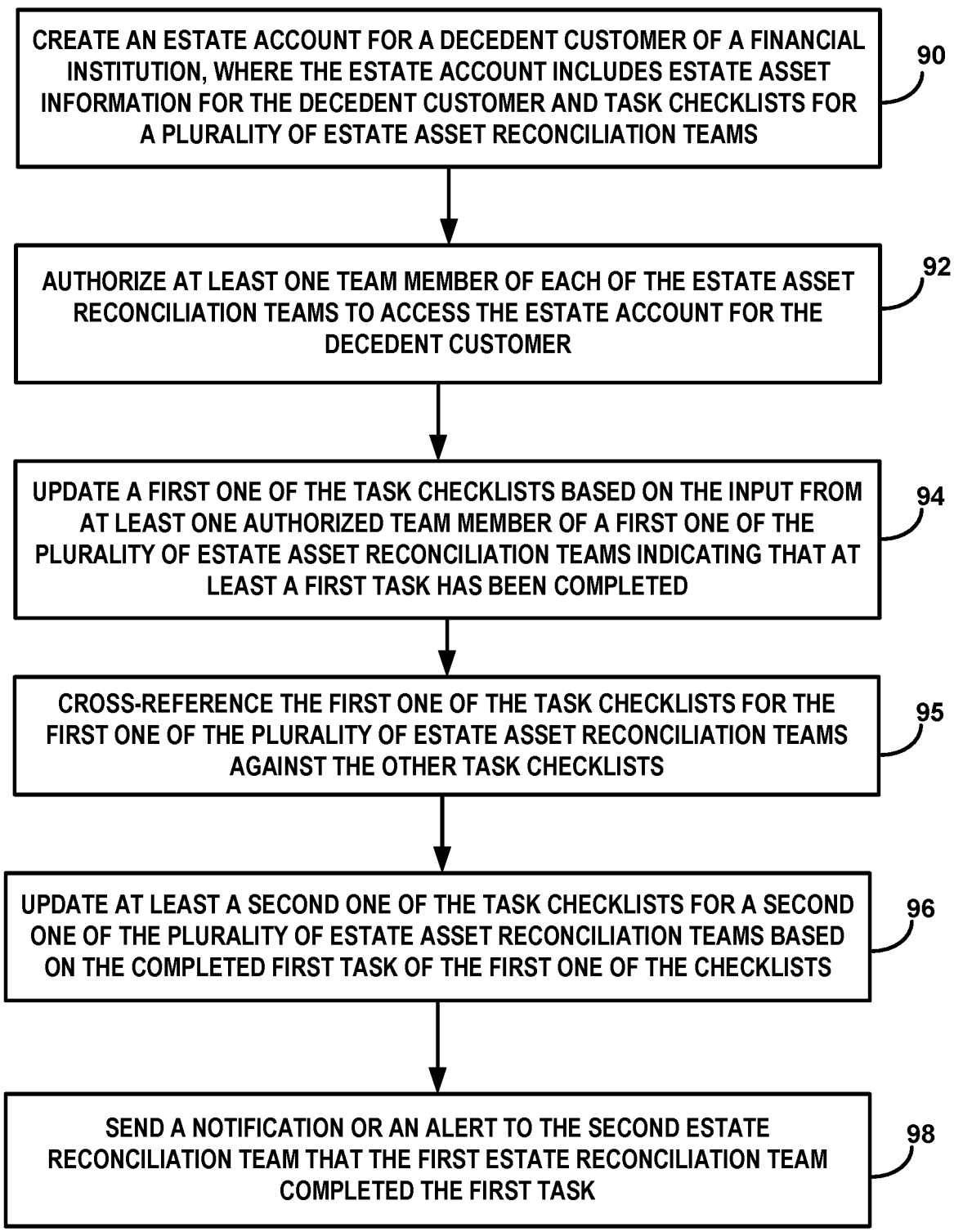
FIG. 6 is a flow diagram illustrating an example process for an estate resource system in accordance with one or more techniques of this disclosure.

FIG. 6 is a flow diagram illustrating an example process for an estate resource system in accordance with one or more techniques of this disclosure. The example shown in FIG. 6 is one example technique among many other possible example techniques. The flow diagram of FIG. 6 will be discussed in terms of the computing device of FIG. 2

A centralized computing device, such as example computing device 220, may include an estate resource system, such as ERS 100A. Computing device 220 may create an estate account for a decedent of a financial institution (90).

Computing device 220 may create the estate account in response to input from a team member of the financial institution who received a death notification from a representative of the decedent's estate, or from some other source. The estate account may include estate asset information as discussed above, including real and personal property, financial accounts and similar information. The estate account may also include task checklists for a plurality of estate settlement services teams. Checklist manager unit 104 of computing device 220 may generate, customize and track completion of the task checklists, as described above.

Computing device 220, via access authorization unit 204, may authorize at least one team member of each of the plurality of estate settlement services teams to access the estate account for the decedent (92). The authorized team member may have access to modify the checklist for a particular team but only be able to view the status of the checklists of other estate reconciliation teams. The authorized team member may have access to add documents, comments, and send and receive messages associated with the decedent's account.

ERS 100A may manage the task checklists for any one or more of estate settlement services teams based on input from a team member of each of the plurality of estate settlement services teams. In one example, an authorized estate reconciliation team member may update a first team's checklist to indicate that the first team completed one or more tasks (94). In some examples the one or more tasks may only be related to the first team's activities. In other examples the one or more tasks may impact other teams, such as "obtain and file appraisal of real property at address XYZ." A real property appraisal may impact one or more other teams, such as estate tax team (ETT) 116, which may need the information to calculate taxes or ESA team 114, which may need to contact beneficiaries with the appraisal information.

Computing device 220 may cross-reference each task on first team's task checklist against the other task checklists (95). Similarly, computing device 220 may cross-reference each task on any team's task checklist with any other team's task checklist. In examples where a task has no linkage to other task checklists, computing device 220 may simply note the completion of the task, and make the completion visible to authorized team members.

In examples where a cross-reference links the first team's checklist to a task on a second team's checklist, computing device 220 may also update the second team's checklist (96). For example, where a task on the second team's checklist is conditional on the first task from the first checklist, computing device 220 may update the second task to indicate that the first task has been marked complete and that the second task may now be completed. As discussed above, computing device 220 may update the second task by changing the font from "greyed out" and not selectable, to a different color, or removing a caution indicator from the first task, or by some other technique. Computing device 220 may repeat this cross-reference action to manage the tasks on additional checklists for additional teams. Any checklist may cross-reference to any other checklist with a variety of different dependencies. In some examples the cross-reference may be conditional as described above, or information-only without any dependency, along with other types of dependencies.

In some examples, simply updating the second team's checklist will be enough to manage the checklists. In other examples, computing device 220 may also send a notification or an alert to the second estate reconciliation team via alert and messaging unit 206 after the first estate reconciliation team completes a given task (98). For example, for some steps in the urgent personal property process 420 depicted in FIG. 4, it may be more appropriate to send an alert to any affected team members, rather than updating another checklist.

A centralized computing device, such as computing device 220 that includes an estate resource system may have significant advantages over separately maintained, uncoordinated team checklists stored in separate team folders or files. An estate resource system, such as ERS 100A may maintain the information gathered from the decedent's representative and/or bank services in a central, secure location with different levels of access as needed to protect privacy or meet other requirements. Moreover, ERS 100A may include additional advantages over simply storing information in a central location. ERS 100A may include information tracking as well as notification and alerts that information is available, missing, past due or in some other status. This may improve the efficiency of an estate reconciliation service by making the information status immediately obvious, so team members may act on the information more quickly. Also, coordinating and making tasks conditional on other tasks may have the advantage of preventing unnecessary work, or a team taking incorrect or unnecessary action.

The invention claimed is:

1. A computing system for reconciling estate assets, the computing system comprising:
   one or more interfaces connected to a plurality of computing devices, the plurality of computing devices including a first computing device capable of being operated by a first member of a first estate settlement services team associated with a financial institution, and a second computing device capable of being operated by a second member of a second estate settlement services team;
   one or more storage units configured to store information related to estate assets of at least one decedent of the financial institution; and
   one or more processors in communication with the one or more interfaces and the one or more storage units and configured to:
      create an estate account for the at least one decedent, wherein the estate account includes the estate asset information for the at least one decedent and a first task checklist for the first estate settlement services team and a second task checklist for the second estate settlement services team, wherein the first task checklist includes a first task item not included on the second task checklist, wherein the second task checklist includes a second task item not included on the first task checklist, and wherein the second task item is dependent upon the first task item so that completion of the second task item requires the first estate settlement services team to complete the first task item not included on the second task checklist for the second estate settlement services team;
      authorize the first member of the first estate settlement team and the second member of the second estate settlement team to access the estate account for the at least one decedent;
      output, to the first computing device, a first user interface that includes a representation of the first task checklist including the first task item but not the second task item;
      output, to the second computing device, a second user interface that includes a representation of the second task checklist including the second task item displayed as having a locked status and being not selectable;

detect input from the first computing device indicating that the first task item in the first task checklist has been completed;

cross-reference the first task checklist against the second task checklist to identify the second task item included in the second task checklist as being dependent on the first task item in the first task checklist;

manage the second task checklist for the second estate settlement services team by modifying the status of the second task item in the second task checklist based on the detected input from the first computing device indicating that the first task item has been completed; and output, to the second computing device, an updated second user interface that includes an updated representation of the second task checklist, wherein the updated representation of the second task checklist includes the second task item displayed as having an unlocked status and being selectable, and wherein the second task item, when presented in the updated second user interface, is visibly distinguishable from the second task item presented in the second user interface.

2. The computing system of claim 1,
wherein the one or more processors are configured to generate notifications of task due dates according to the first task checklist for the first estate settlement services team; and
wherein the one or more interfaces are configured to send the notifications to the first computing device.

3. The computing system of claim 1, wherein the one or more processors are further configured to cross-reference the first task checklist against a third task checklist to identify any tasks in the third task checklist that are conditioned on the completion of the first task item in the first task checklist.

4. The computing system of claim 1,
wherein the one or more processors are further configured to generate a notification that the first task item in the first task checklist is completed; and
wherein the one or more interfaces are configured to send the notification to the second computing device.

5. The computing system of claim 1, wherein to authorize the first member access to the estate account, the one or more processors are further configured to:
authorize the first member to modify the first task checklist for the first estate settlement services team; and
authorize the first member to view the second task checklist.

6. The computing system of claim 1, wherein the one or more processors are further configured to generate progress reports for the first and second estate settlement services teams, each of the progress reports indicating progress towards completion of a respective one of the task checklists, wherein the progress reports are viewable by the first member and the second member.

7. The computing system of claim 1, wherein the one or more processors are further configured to generate system performance reports, wherein the system performance reports indicate one or more of: time required to complete the first task checklist, a delay in completing a given task on the first task checklist, or a process efficiency for reconciling estate assets.

8. The computing system of claim 1, wherein the one or more processors are further configured to:

send a system change request notification over the one or more interfaces to the first computing device;
receive a system change request over the one or more interfaces from the first computing device; and
track a status of the system change request, wherein the system change request may describe an update to one or more of the computing system, a configuration of the computing system, the first task checklist, or the second task checklist.

9. The computing system of claim 1, wherein the one or more processors are further configured to manage assignment of the first member of the first estate settlement services team to the estate account.

10. The computing system of claim 1, wherein the one or more processors are further configured to generate the first and second task checklists based on the estate asset information for the at least one decedent.

11. The computing system of claim 1, wherein the one or more processors are further configured to provide a communication platform over which the first member is able to communicate with one or more of: a representative of the decedent, the second member, or an administrator of the computing system.

12. The computing system of claim 11, wherein the one or more processors are further configured to authorize only one team member of the first estate settlement services team to communicate with the representative of the decedent via the communication platform.

13. The computing system of claim 1, wherein the one or more processors are further configured to retrieve the estate asset information of the decedent from at least one of: the financial institution or a representative of the decedent.

14. A method for reconciling estate assets, the method comprising:
creating, by a computing system, an estate account for at least one decedent of a financial institution, wherein the estate account includes estate asset information for the at least one decedent and a first task checklist for a first estate settlement services team associated with the financial institution and a second task checklist for a second estate settlement services team, wherein the first task checklist includes a first task item not included on the second task checklist, wherein the second task checklist includes a second task item not included on the first task checklist, and wherein the second task item is dependent upon the first task item so that completion of the second task item requires the first estate settlement services team to complete the first task item not included on the second task checklist for the second estate settlement services team;

authorizing, by the computing system and based on authentication credentials received from a first computing device, a first team member of the first estate settlement services team to access the estate account for the at least one decedent;

authorizing, by the computing system and based on authentication credentials from a second computing device, a second team member of the second estate settlement services team to access the estate account for the at least one decedent;

outputting, to the first computing device, a first user interface that includes a representation of the first task checklist including the first task item but not the second task item;

outputting, to the second computing device, a second user interface that includes a representation of the second task checklist including the second task item displayed as having a locked status;

detecting input from the first computing device indicating that the first task item in the first task checklist has been completed;

cross-referencing the first task checklist against the second task checklist to identify the second task item included in the second task checklist as being dependent on the first task item in the first task checklist;

managing, by the computing system, the second task checklist for the second estate settlement services team by modifying the status of the second task item in the second task checklist based on the detected input from the first computing device indicating that the first task item has been completed; and outputting, to the second computing device, an updated second user interface that includes an updated representation of the second task checklist, wherein the updated representation of the second task checklist includes the second task item displayed as having an unlocked status and being selectable, and wherein the second task item, when presented in the updated second user interface, is visibly distinguishable from the second task item presented in the second user interface.

15. The method of claim 14, further comprising:

generating notifications of task due dates according to the first and second task checklists for the first and second estate settlement services teams; and sending the notifications to the first and second computing devices.

16. The method of claim 14, wherein authorizing access to the estate account comprises:

authorizing the first team member to modify the first task checklist for the first estate settlement services team; and authorizing the first team member to view the second task checklist.

17. A system for reconciling estate assets, the system comprising:

a plurality of team member computing devices of each of a plurality of estate settlement services teams associated with a financial institution, including a first computing device capable of being operated by a first member of a first estate settlement services team, and a second computing device capable of being operated by a second member of a second estate settlement services team; and a computing system in communication with the plurality of estate settlement services teams, the computing system configured to:

create an estate account for at least one decedent of the financial institution, the estate account including estate asset information for the at least one decedent and a first task checklist for the first estate settlement services team and a second task checklist for the second estate settlement services team, each of the task checklists indicating tasks to be completed by a respective one of the plurality of estate settlement services teams to settle the estate assets of the decedent, wherein the first task checklist includes a first task item not included on the second task checklist, wherein the second task checklist includes a second task item not included on the first task checklist, and wherein the second task item is dependent upon the first task item so that completion of the second task item requires the first estate settlement services team to complete the first task item not included on the second task checklist for the second estate settlement services team, authorize the first member of the first estate settlement team and the second member of the second estate settlement team to access the estate account for the at least one decedent, output, to the first computing device, a first user interface that includes a representation of the first task checklist including the first task item but not the second task item, output, to the second computing device, a second user interface that includes a representation of the second task checklist including the second task item displayed as having a locked status, detect input from the first computing device indicating that the first task item in the first task checklist has been completed, cross-reference the first task checklist against the second task checklist to identify the second task item included in the second task checklist as being dependent on the first task item in the first task checklist, manage the second task checklist for the second estate settlement services team by modifying the status of the second task item in the second task checklist based on the detected input from the first computing device indicating that the first task item has been completed, and output, to the second computing device, an updated second user interface that includes an updated representation of the second task checklist, wherein the updated representation of the second task checklist includes the second task item displayed as having an unlocked status and being selectable, and wherein the second task item, when presented in the updated second user interface, is visibly distinguishable from the second task item presented in the second user interface.

18. The system of claim 17, wherein the computing system is further configured to cross-reference the first task checklist against a third task checklist to identify any tasks in the third task checklist that are conditioned on completion of the first task item in the first task checklist.

* * * * *